US008527080B2

(12) United States Patent
Assaf et al.

(10) Patent No.: US 8,527,080 B2
(45) Date of Patent: Sep. 3, 2013

(54) METHOD AND SYSTEM FOR MANAGING PROCESS JOBS IN A SEMICONDUCTOR FABRICATION FACILITY

(75) Inventors: Shay Assaf, Cupertino, CA (US); Venkatesh Babu, San Jose, CA (US); Robert D. Flores, Campbell, CA (US); Brendan Hickey, San Francisco, CA (US); Krishna Kuttannair, San Jose, CA (US); Song J. Park, Pleasanton, CA (US); Adrian Rhee, Santa Clara, CA (US); Chongyang Chris Wang, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 680 days.

(21) Appl. No.: 12/244,735

(22) Filed: Oct. 2, 2008

(65) Prior Publication Data
US 2010/0087941 A1 Apr. 8, 2010

(51) Int. Cl.
*G06F 19/00* (2011.01)

(52) U.S. Cl.
USPC .......................... 700/101; 700/121; 718/104

(58) Field of Classification Search
USPC ................ 700/121, 100, 101, 102; 718/103, 718/104, 105
See application file for complete search history.

(56) References Cited

U.S. PATENT DOCUMENTS

| 5,155,573 | A | 10/1992 | Abe et al. |
| 5,311,438 | A | 5/1994 | Sellers et al. |
| 5,311,562 | A | 5/1994 | Palusamy et al. |
| 5,377,308 | A | 12/1994 | Inoue et al. |
| 5,402,367 | A | 3/1995 | Sullivan et al. |
| 5,442,562 | A | 8/1995 | Hopkins et al. |
| 5,544,308 | A | 8/1996 | Giordano et al. |
| 5,623,109 | A | 4/1997 | Uchida et al. |
| 5,654,896 | A | 8/1997 | Ochi |
| 5,694,401 | A | 12/1997 | Gibson |
| 5,719,796 | A | 2/1998 | Chen |
| 6,038,540 | A | 3/2000 | Krist et al. |
| 6,088,676 | A | 7/2000 | White |
| 6,202,181 | B1 | 3/2001 | Ferguson et al. |
| 6,370,437 | B1 | 4/2002 | Carter et al. |

(Continued)

FOREIGN PATENT DOCUMENTS

| JP | 06-347379 | 12/1994 |
| JP | 3147586 | 3/2001 |

(Continued)

OTHER PUBLICATIONS

International preliminary report on patentability, PCT/US2009/044243, mailed Nov. 23, 2010, 6 pages.

(Continued)

*Primary Examiner* — Mohammad Ali
*Assistant Examiner* — Sheela S Rao
(74) *Attorney, Agent, or Firm* — Blakely, Sokoloff, Taylor and Zafman, LLP (57) ABSTRACT

A method and system for managing process jobs in a semiconductor fabrication facility is described. In one embodiment, the method includes receiving a plurality of process jobs associated with one or more priorities. The method further includes executing the plurality of process jobs in an order reflecting the priorities. The order is modifiable in real time upon receiving a new process job with a priority higher than the priorities of the plurality of process jobs.

20 Claims, 7 Drawing Sheets

(56) References Cited

U.S. PATENT DOCUMENTS

| | | |
|---|---|---|
| 6,421,571 B1 | 7/2002 | Spriggs et al. |
| 6,546,523 B1 | 4/2003 | Boorananut et al. |
| 6,560,736 B2 | 5/2003 | Ferguson et al. |
| 6,591,232 B1 | 7/2003 | Kassapoglou |
| 6,625,688 B1 | 9/2003 | Fruehling et al. |
| 6,678,569 B2 | 1/2004 | Bunkofske et al. |
| 6,731,990 B1 | 5/2004 | Carter et al. |
| 6,775,576 B2 | 8/2004 | Spriggs et al. |
| 6,775,819 B1 | 8/2004 | Hardikar et al. |
| 6,868,342 B2 | 3/2005 | Mutter |
| 6,889,096 B2 | 5/2005 | Spriggs et al. |
| 6,907,545 B2 | 6/2005 | Ramadei et al. |
| 6,952,688 B1 | 10/2005 | Goldman et al. |
| 6,954,883 B1 | 10/2005 | Coss, Jr. et al. |
| 6,954,884 B2 | 10/2005 | Dean et al. |
| 7,062,411 B2 | 6/2006 | Hopkins et al. |
| 7,072,794 B2 | 7/2006 | Wittkowski |
| 7,079,677 B2 | 7/2006 | Tai et al. |
| 7,089,154 B2 | 8/2006 | Rasmussen et al. |
| 7,099,815 B2 | 8/2006 | Christodoulou et al. |
| 7,151,976 B2 | 12/2006 | Lin |
| 7,169,625 B2 | 1/2007 | Davis et al. |
| 7,349,753 B2 | 3/2008 | Paik |
| 7,355,693 B2 | 4/2008 | Takeda et al. |
| 7,380,213 B2 | 5/2008 | Pokorny et al. |
| 7,413,546 B2 | 8/2008 | Agutter et al. |
| 7,587,296 B2 | 9/2009 | Harvey et al. |
| 7,596,718 B2 | 9/2009 | Harvey, Jr. et al. |
| 7,765,020 B2 | 7/2010 | Lin et al. |
| 7,831,326 B2 | 11/2010 | Lin et al. |
| 7,974,723 B2 | 7/2011 | Moyne et al. |
| 8,010,321 B2 | 8/2011 | Lin et al. |
| 8,214,308 B2 | 7/2012 | Chu |
| 8,244,498 B2 | 8/2012 | Wold et al. |
| 2002/0133444 A1 | 9/2002 | Sankaran et al. |
| 2002/0143472 A1 | 10/2002 | Mutter |
| 2003/0005486 A1 | 1/2003 | Ridolfo et al. |
| 2003/0018616 A1 | 1/2003 | Wilbanks et al. |
| 2003/0100131 A1* | 5/2003 | Fang et al. ............... 438/14 |
| 2003/0109951 A1 | 6/2003 | Hsiung et al. |
| 2003/0171897 A1 | 9/2003 | Bieda et al. |
| 2003/0225466 A1 | 12/2003 | Yulevitch et al. |
| 2003/0233287 A1 | 12/2003 | Sadler et al. |
| 2004/0002842 A1 | 1/2004 | Woessner et al. |
| 2004/0024543 A1 | 2/2004 | Zhang et al. |
| 2004/0110310 A1 | 6/2004 | Sun et al. |
| 2004/0210850 A1 | 10/2004 | Bermudez et al. |
| 2004/0254762 A1 | 12/2004 | Hopkins et al. |
| 2005/0010117 A1 | 1/2005 | Agutter et al. |
| 2005/0033464 A1 | 2/2005 | Nguyen |
| 2005/0033527 A1 | 2/2005 | Wada et al. |
| 2005/0033734 A1 | 2/2005 | Chess et al. |
| 2005/0060103 A1 | 3/2005 | Chamness |
| 2005/0114023 A1 | 5/2005 | Williamson et al. |
| 2005/0114743 A1 | 5/2005 | Moorhouse |
| 2005/0221596 A1* | 10/2005 | You et al. ............... 438/598 |
| 2005/0234684 A1 | 10/2005 | Sawicki et al. |
| 2006/0111804 A1 | 5/2006 | Lin |
| 2006/0184264 A1 | 8/2006 | Willis et al. |
| 2006/0265185 A1 | 11/2006 | Lanzerotti et al. |
| 2007/0006037 A1 | 1/2007 | Sargusingh et al. |
| 2007/0021859 A1 | 1/2007 | Lev-Ami et al. |
| 2007/0028220 A1 | 2/2007 | Miller et al. |
| 2007/0038418 A1 | 2/2007 | Ahn et al. |
| 2007/0067678 A1 | 3/2007 | Hosek |
| 2007/0192064 A1 | 8/2007 | Nakamura et al. |
| 2007/0192128 A1 | 8/2007 | Celestini |
| 2008/0082197 A1 | 4/2008 | Lacaille |
| 2008/0183444 A1 | 7/2008 | Grichnik et al. |
| 2008/0195241 A1* | 8/2008 | Lin et al. ............... 700/101 |
| 2008/0229318 A1* | 9/2008 | Franke ............... 718/104 |
| 2008/0276137 A1 | 11/2008 | Lin et al. |
| 2009/0118842 A1 | 5/2009 | Norman et al. |
| 2009/0119077 A1 | 5/2009 | Norman et al. |
| 2009/0228129 A1 | 9/2009 | Moyne et al. |
| 2009/0287339 A1 | 11/2009 | Shimshi |
| 2010/0076729 A1 | 3/2010 | Davis et al. |
| 2010/0087941 A1 | 4/2010 | Assaf et al. |
| 2010/0199285 A1 | 8/2010 | Medovich |
| 2011/0035037 A1 | 2/2011 | Weber et al. |

FOREIGN PATENT DOCUMENTS

| | | |
|---|---|---|
| KR | 10-2004-0004664 | 1/2004 |
| WO | WO-2009/143031 | 11/2009 |
| WO | WO-2010/093821 | 8/2010 |

OTHER PUBLICATIONS

Written Opinion of the International Searching Authority, PCT/US2009/044243, mailed Dec. 29, 2009, 5 pages.

International Search Report, PCT/US2009/044243, mailed May 19, 2008, 3 pages.

International Search Report, PCT/US2010/023942, mailed Oct. 12, 2010, 4 pages.

"Introduction to the SEMI 300mm Standards", Revision C, Aug. 26, 2003, pp. 1-8, Cimetrix Incorporated, Salt Lake City, Utah.

"SEMI E30.5-0302 Specification for Metrology Specific Equipment Model", www.semi.org, Dec. 2001, pp. 1-33.

"SEMI E40-0705 Standard for Processing Management", www.semi.org, Jun. 2005, pp. 1-25.

"SEMI E94.1-1101 Specification for SECS-II Protocol for Control Job Management (CJM)", www.semi.org, Sep. 2001, pp. 1-6.

"SEMI E94-0302 Provisional Specification for Control Job Management", www.semi.org, Dec. 2001, pp. 1-21.

Moyne, James, "Glossary of SEMI Standards: Current and Pending", Nov. 1998, University of Michigan, MiTeX Solutions, Inc., http://www.integratedmeasurement.org/standards/stand03.htm, pp. 1-3.

Written Opinion of the International Searching Authority for Application No. PCT/US2010/023942, Oct. 12, 2010, 6 pages.

International Preliminary Report on Patentability for Application No. PCT/US2010/023942, Aug. 16, 2011, 7 pages.

Ogawa, Masatoshi, et al., "Development of Sequential Prediction System for Large Scale Database-based Online Modeling", *International Conference on Control, Automation and Systems*, Oct. 17-20, 2007, Seoul, Korea; 4 pages.

* cited by examiner

METHOD AND SYSTEM FOR MANAGING PROCESS JOBS IN A SEMICONDUCTOR FABRICATION FACILITY

FIELD OF INVENTION

Embodiments of the invention relate to semiconductor fabrication, and more particularly, to process job management in a semiconductor fabrication facility.

BACKGROUND OF THE INVENTION

In a semiconductor fabrication factory, various fabrication tools are used to process substrates for a particular purpose such as photolithography, chemical-mechanical planarization (CMP), chemical vapor deposition or diffusion. In a typical configuration, fabrication tools are grouped together and loosely controlled by a controller. The controller usually communicates with either an individual tool or a group of tools using an interface provided by industrial standards such as Semiconductor Equipment and Materials International (SEMI) standards.

The SEMI standards, which cover equipment automation, are widely applied to semiconductor fabrication systems. However, the SEMI standards do not provide a context for implementation, and thus, each knowledgeable engineer may come up with a different implementation conforming to the SEMI standards.

In particular, SEMI E30, Generic Model for Communications and Control of Manufacturing Equipment (GEM), defines the behavior of manufacturing equipment. SEMI E40, Standard for Processing Management, also referred to as the Process Job standard, defines material processing in relation to the behavior of manufacturing equipment. Under SEMI E40, a process job specifies a process to be executed for a particular set of substrates. Process jobs are queued and then set to an execution state. This execution state may be one of the following states: setup, wait, process, complete, stop, pause and abort. However, SEMI E40, as well as other SEMI standards, is silent regarding the order in which process jobs should be executed in a fabrication system. In the current implementation of SEMI E40, the order in which process jobs should be initiated is determined by the GEM Process (GP) software, and a real-time controller does not change the order. As a result, process jobs are executed on a first-come-first-served basis, and thus, a new urgent process job should wait to be executed until the preceding process jobs are finished.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the present invention provide methods and systems for managing process jobs in a semiconductor fabrication facility. In one embodiment, multiple process jobs associated with priorities are received, and the received process jobs are executed in the order reflecting the priorities. The order is modifiable in real time upon receiving a new process job with a priority higher than the priorities of the existing process jobs.

As a result, a lot that needs to be processed urgently ("hot lot") can be processed ahead of lots that are already queued and being processed. This enables priority scheduling of hot lots and increases overall productivity of the factory.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy discs, optical discs such as CDs, DVDs and BDs (Blu-Ray Discs), and magnetic-optical discs, read-only memories (ROMs), random access memories (RAMs), EPROMs, EEPROMs, magnetic or optical cards, or any type of media suitable for storing electronic instructions, currently available or to be developed in the future.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"), random access memory ("RAM"), magnetic disc storage medium, optical disc storage medium, flash memory device, etc.

Figure 1:
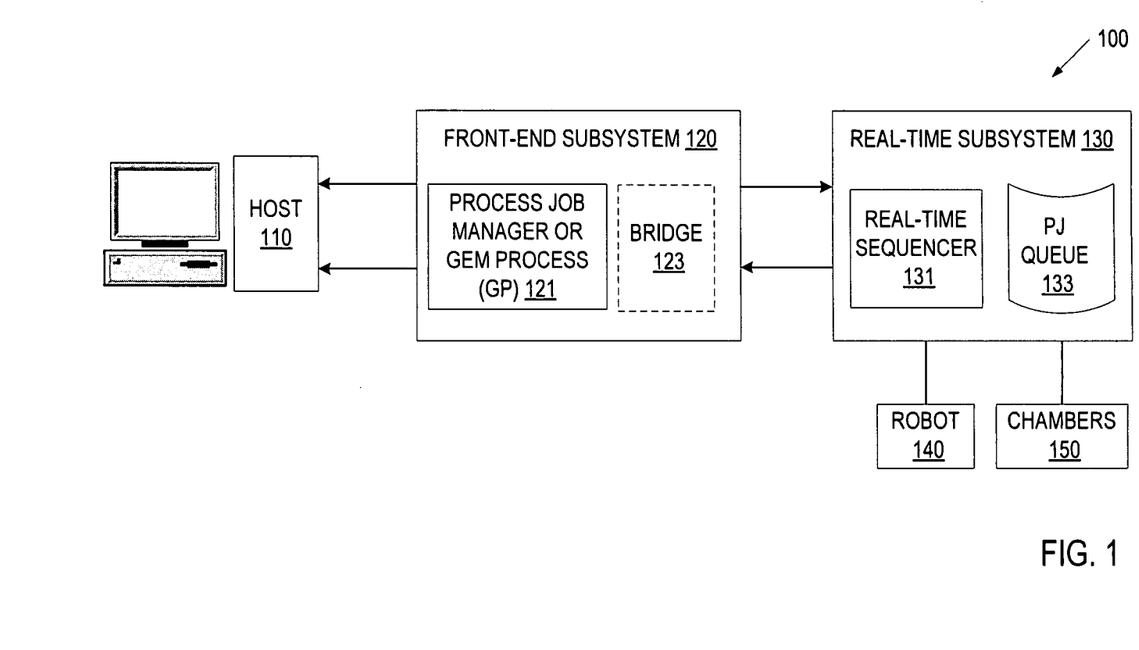
FIG. 1 is a block diagram of an exemplary system architecture in which embodiments of the invention may operate.

FIG. 1 is a block diagram of exemplary system architecture 100 in which embodiments of the present invention may operate. The system architecture 100 may include a host subsystem 110, a front-end subsystem 120 and a real-time subsystem 130.

The host subsystem 110 may be part of a factory network and may include one or more computing devices such as personal computers, lap tops, workstations, servers or any other devices. In one embodiment, the host subsystem 110 is responsible for defining process jobs. A process job specifies a process that is to be performed on a particular set of substrates by one or more fabrication tools. A substrate represents a basic unit of material on which work is performed to create a product. Examples include wafers, lead frames, die, flat panel displays, circuit boards, disks, etc. In one embodiment, the host subsystem 110 also defines a control job that specifies a unit of work to be performed by one or more process jobs.

The host subsystem 110 defines process jobs and control jobs based on information provided by a system user or process supervisor. This information may identify a process to be performed. In addition, the above information may identify substrates (e.g., wafers) to be processed, tools to perform the processing, etc. In one embodiment, the user is also allowed to assign a priority to a process job. The user may provide process job information and assign the priority through a user interface (e.g., a GUI or command line interface) presented by the host subsystem 110 or another system. The host subsystem 110 may then create process jobs and control jobs based on the information provided by the user.

The host subsystem 110 communicates with the front-end subsystem 120 directly or via a network. The network may be a public network (e.g., Internet) or a private network (e.g., Ethernet, a Local Area Network (LAN), a corporate intranet or a factory network) or any combination of the above. The front-end subsystem 120 may include one or more computing devices such a personal computer, a workstation, a server or any other device.

The front-end subsystem 120 may include a process job manager 121 and a bridge 123. The process job manager 121 manages process jobs to be executed by the real-time subsystem 130 in conjunction with the robot 140 and the chambers 150. The bridge 123 may provide an interface between the process job manager 121 and the real-time subsystem 130.

In one embodiment, the process job manager 121 receives process jobs from the host subsystem 110, sends them out to the real-time subsystem 130 (e.g., via the bridge 123), and ensures that a particular set of substrates is handled by a fabrication tool according to the definition of the process job. In order to facilitate the appropriate handling of the substrates, the process job manager 121 may issue relevant commands to the real-time subsystem 130 such as commands to start, abort, pause or resume a process job.

In addition, in one embodiment, the process job manager 121 ensures that each process job is assigned a priority. If a process job received from the host subsystem 110 already has a priority assigned by the user, the process job manager 121 informs the real-time subsystem 130 of the priority. Otherwise, the process job manager 121 may assign a default priority (e.g., zero priority) to a process job that does not have an assigned priority.

In one embodiment, the process job manager 121 is implemented in software and conforms to SEMI E30, Generic Model for Communications and Control of SEMI Equipment (GEM), representing a "GEM Process" (GP), or to SEMI E5, SEMI Equipment Communications. In one embodiment, the bridge 123 supports communication protocols under the SEMI standards to provide an interface between the process job manager 121 as a GP and the real-time subsystem 130.

The front-end subsystem 120 communicates with the real-time subsystem 130 directly or via a network. The network may be a public network (e.g., Internet) or a private network (e.g., Ethernet, a Local Area Network (LAN), a corporate intranet or a factory network) or any combination of the above. The real-time subsystem 130 may include one or more computing devices such as a personal computer, a workstation, a server or any other device.

The real-time subsystem 130 may include a real-time sequencer 131 and a queue 133. The real-time sequencer 131 receives one or more process jobs from the front-end subsystem 120. Upon receiving the process jobs, the real-time sequencer 131 places the process jobs in the queue 133 in the order reflecting the priorities. In addition, the real-time sequencer 131 is capable of re-ordering process jobs in real time upon receiving a new process job with a priority higher than the priorities of the existing process jobs in the queue 133. For example, the real-time sequencer 131 can place a new process job with a higher priority ahead of the existing process jobs with lower priorities or no priority in the queue 133. As a result, the new process job will be executed as soon as the process job that is currently being run is completed. In other words, the new process job is executed ahead of the existing process jobs that are waiting for their turn in the queue 133. The real-time sequencer 131 may be implemented in hardware (e.g., as input/output circuitry that forms an interface between I/O devices, as well as an interface to the robot 130 and/or the chambers 140). Alternatively, the real-time sequencer 131 may be implemented in software. The queue 133 may reside in memory of the real-time subsystem 130 or be hosted by a data storage device coupled with the real-time subsystem 130.

The real-time subsystem 130 communicates with the robot 140 and chambers 150 directly or via a network. The network may be a public network (e.g., Internet) or a private network (e.g., Ethernet, a Local Area Network (LAN), a corporate intranet or a factory network) or any combination of the above. The robot 140 represents a factory interface between the real-time subsystem 130 and one or more fabrication tools in a factory. The robot 140 may be a substrate transfer robot in a docketing station in a fabrication factory. The chambers 150 may be processing chambers, load-lock chambers, substrate transfer chambers, etc., provided for one or more fabrication tools.

It should be noted that the architecture illustrated in FIG. 1 may vary depending on the configuration of a particular factory. For example, parts or all of the front-end subsystem 120 and the real-time subsystem 130 can be combined into a single subsystem, the real-time subsystem 130 may be implemented as multiple separate systems (one system per one or more robots, one system per one or more chambers or one system per one or more fabrication tools), etc. In addition, the robot 140 and chambers 150 can be replaced with any other equipment controllable by the real-time subsystem 130.

Figure 2:
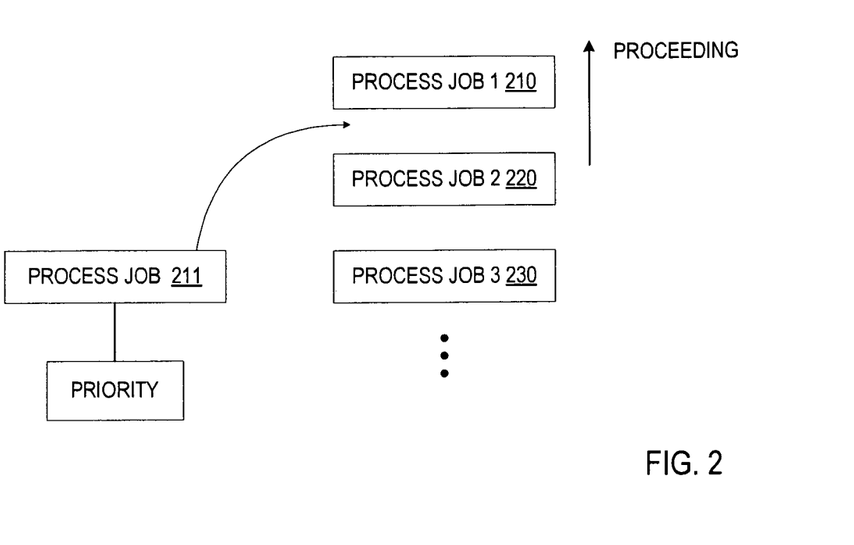
FIG. 2 illustrates an exemplary handling of process jobs in accordance with some embodiments of the present invention.

FIG. 2 illustrates an exemplary handling of process jobs in accordance with one embodiment of the present invention. As discussed above, a process job indicates a process, which is applied to substrates such as wafers. A process job specifies and tracks a processing resource such as a fabrication tool, and may contain the information required by the processing resource to achieve processing of the semiconductor material without further intervention by a system user or process supervisor. A process job may include several sequential phases (e.g., processing resource pre-conditioning before substrate arrival, substrate and processing resource preparation for processing, substrate processing, processing resource post-conditioning after substrate departure). A process job may be associated with one or more recipes for processing a substrate. A recipe may be a set of instructions, settings, and parameters under control of a processing resource that determines processing environments seen by a substrate. A recipe may be subject to change between runs or processing cycles.

In one embodiment, when process jobs are received, they are set to an execution state. This execution state may be one of the following states: setup, wait, process, complete, stop, pause and abort.

In one embodiment, a system user or process supervisor is allowed to assign a priority to a process job. A priority can be specified as a number (e.g., 0, 1, 2, 3, etc.) or a level (e.g., low, medium, high). A priority can be assigned using a user interface (e.g., GUI or command level interface). In another embodiment, a priority is automatically determined based on a user-specified attribute of a process job. Attributes of a process job may indicate any kind of characteristics associated with a process job, including characteristics of a substrate, recipe or a fabrication tool, etc.

When the process jobs are received, they are placed in a queue in the order of their priorities. FIG. 2 illustrates a queue including process jobs 210, 220 and 230. When a new process job 211 is received, process job 210 is being executed, and process jobs 220 and Job 230 are waiting in the queue for their turn to be executed. When process job 211 is received, its priority is compared with the priorities of the existing process jobs 220 and 230 in the queue. If the new process Job 211 has a higher priority than process jobs 220 and 230, process job 211 can interrupt the proceeding order to be executed immediately after process job 210.

Figure 3:
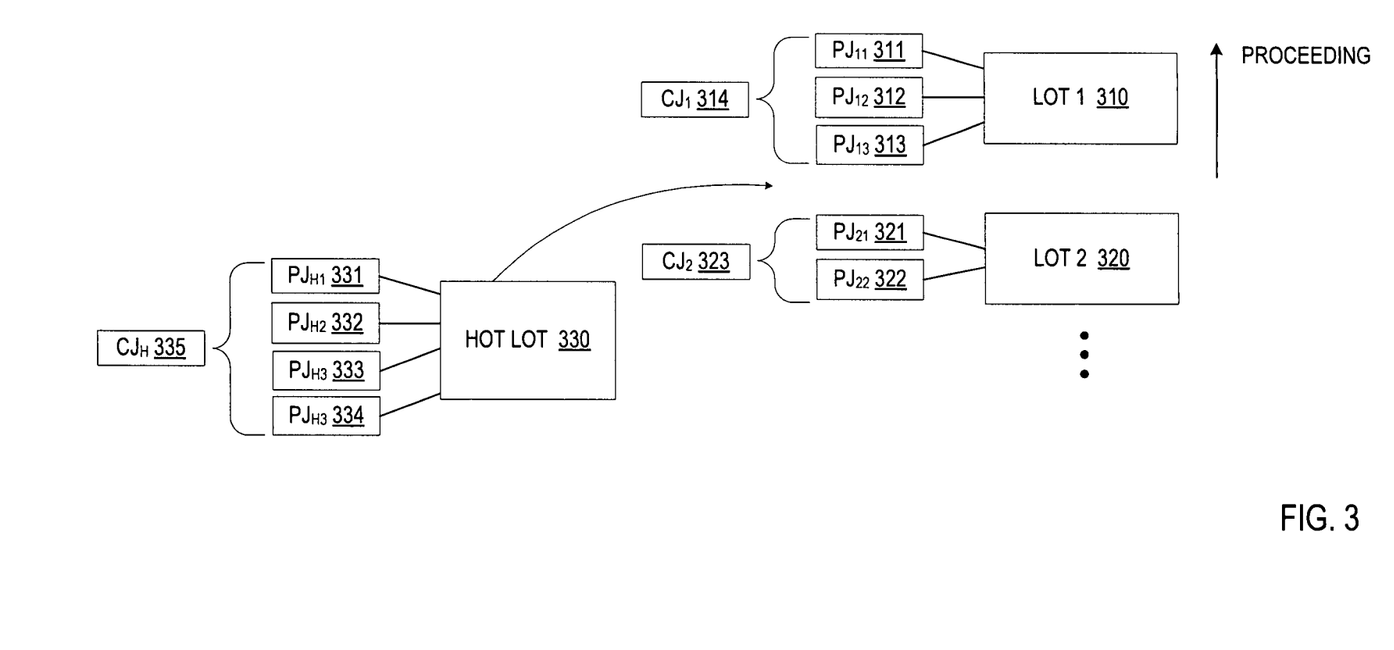
FIG. 3 illustrates another exemplary handling of process jobs in accordance with other embodiments of the present invention.

FIG. 3 illustrates another exemplary handling of process jobs in accordance with another embodiment of the present invention. In this other embodiment, substrates are grouped into lots and processed as lots using control jobs that combine multiple process jobs. As discussed above, a control job indicates a unit of work, which may be performed by a set of one or more process jobs, for one or more carriers, using one or more fabrication tools. A control job can be used to reduce the amount of host level interaction for processing by one or more fabrication tools. In one embodiment, a control job is defined under SEMI E94 for Control Job Management.

Referring to FIG. 3, a queue includes control jobs 314 and 323. Control job 314 is designated to process lot 310 and consists of process jobs 311, 312 and 313. Control job 323 is designated to process lot 320 and consists of process jobs 321 and 322. When a new control job 335 is received, lot 310 is being processed, and lot 320 is waiting for its turn to be processed. New control job 335 is designated to process hot lot 330 using process jobs 331, 332, 333 and 334. The process jobs 331, 332, 333 and 334 are assigned a priority higher than the priority of process jobs 321 and 322. Thus, although hot lot 330 arrives after lot 320, hot lot 330 can interrupt the current proceeding order because it has process jobs with a higher priority.

It should be noted that not all process jobs of the control job can have a high priority. In this case, in one embodiment, only the process jobs with a higher priority will be placed ahead of the existing jobs in the queue. In an alternative embodiment, if at least one process job within the control job has a higher priority than the currently scheduled jobs, all process jobs within this control job are placed ahead of the existing jobs in the queue.

Figure 4:
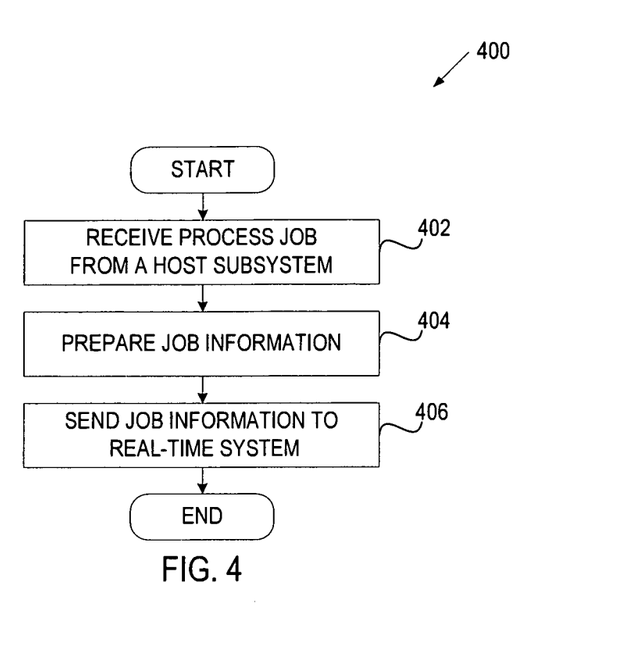
FIG. 4 is a flow diagram of one embodiment of a method for managing process jobs by a front-end subsystem.

FIG. 4 is a flow diagram of one embodiment of a method 400 for managing process jobs by a front-end subsystem. The method 400 is performed by processing logic that may comprise hardware (circuitry, dedicated logic, etc.), software (such as is run on a general purpose computer system or a dedicated machine), or a combination of both. In one embodiment, the method 400 is performed by a front-end subsystem 120 of FIG. 1.

Referring to FIG. 4, method 400 begins with processing logic receiving process jobs from a host subsystem (block 402). In one embodiment, processing logic receives one process job at a time. In another embodiment, processing logic receives one or more groups of process jobs in which each group is associated with a control job. Some or all of the received process jobs may have a priority assigned by a system user via the host subsystem.

At block 404, processing logic prepares job information regarding the process jobs. The job information may include a process job identifier and a priority assigned to the process job. A priority may be specified as a number (e.g., 0, 1, 2, 3, etc.) or a level (e.g., low, medium, high). If a process job does not have an assigned priority, processing logic may add a default priority to this process job or leave this process job without a priority. In one embodiment, in which process jobs are associated with control jobs, the job information also includes information regarding a relevant control job.

At block 406, processing logic sends the job information to the real-time subsystem. In one embodiment, processing logic sends the job information for one process job at a time. In another embodiment, processing logic sends the job information for one or more groups of process jobs at a time. In yet another embodiment, processing logic sends the job information for one control job at a time.

Figure 5:
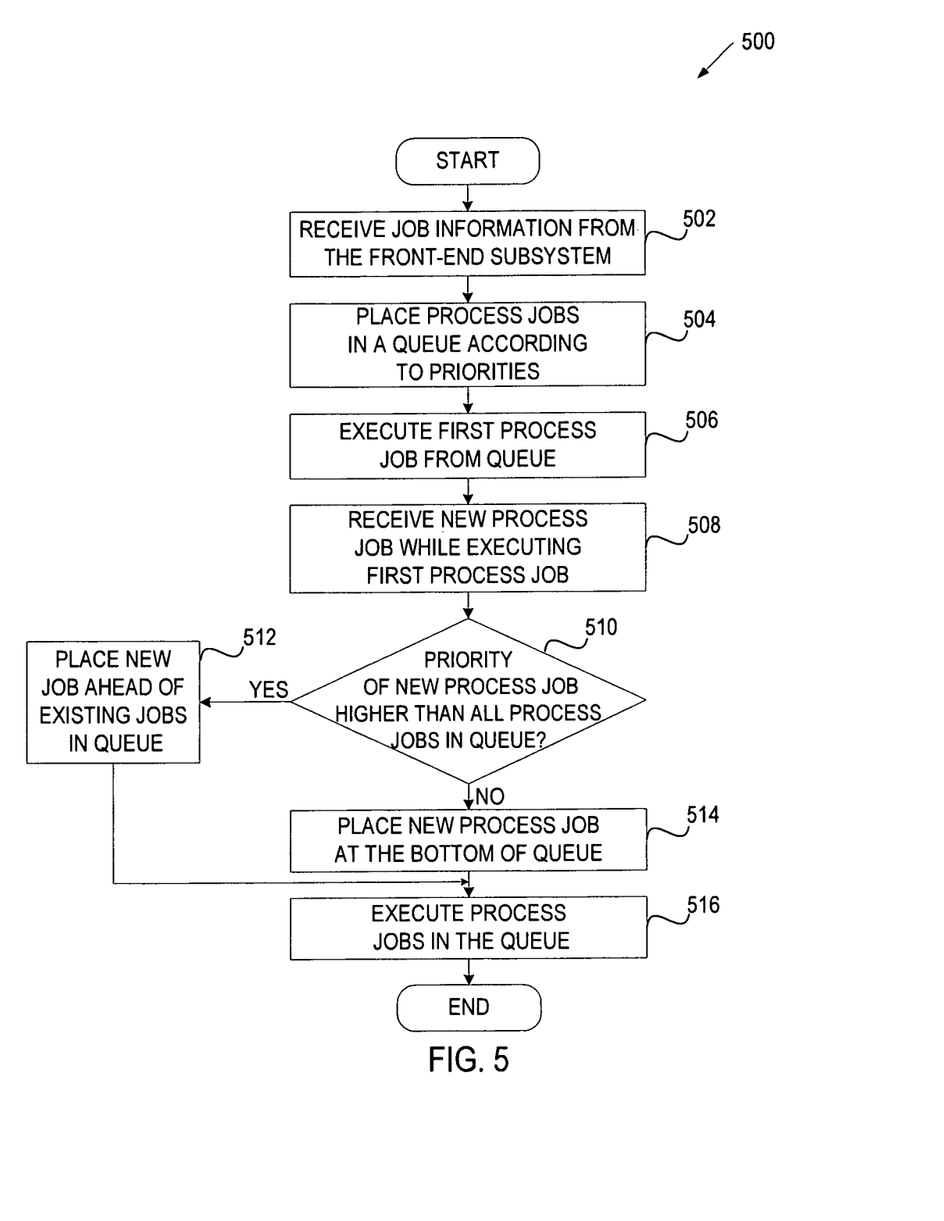
FIG. 5 is a flow diagram of one embodiment of a method for managing process jobs by a real-time subsystem.

FIG. 5 is a flow diagram of one embodiment of a method 500 for managing process jobs by a real-time subsystem. The method 500 is performed by processing logic that may comprise hardware (circuitry, dedicated logic, etc.), software (such as is run on a general purpose computer system or a dedicated machine), or a combination of both. In one embodiment, the method is performed by real-time subsystem 130 of FIG. 1.

Referring to FIG. 5, the method 500 begins with processing logic receiving job information from the front-end system (block 502). The job information may include an identifier(s) of a process job(s) and a priority assigned to the process job(s). A priority may be specified as a number (e.g., 0, 1, 2, 3, etc.) or a level (e.g., low, medium, high). The job information may also include information regarding a corresponding control job.

At block 504, processing logic places the process jobs in a queue according to the priorities. In particular, a process job with a higher priority is placed in the queue ahead of process jobs with lower priorities or no priority. In one embodiment, process jobs with the same priorities are placed in the queue on a first-come, first-served basis.

At block 506, processing logic starts to execute the first process job from the queue. In one embodiment, processing logic starts executing the first process job when an appropriate processing resource becomes available. Processing resource may include one or more fabrication tools, a robot, chambers, substrates, etc.

At block 508, processing logic receives a new process job while executing the first process job. At block 510, processing logic determines whether the priority of the new process job is higher that the priorities of the process jobs in the queue. If so, processing logic places the new process job at the top of the queue (block 512) and proceeds to block 516. Otherwise, if none of the process jobs in the queue have a priority lower than the priority of the new process job, processing logic places the new process job at the bottom of the queue (block 514). If there is at least one existing process job in the queue with the priority lower than the priority of the new process job, processing logic places the new process job immediately before that existing process job.

At block 516, processing logic continues executing the process jobs from the queue. In one embodiment, processing logic executes the process jobs sequentially based on their placement in the queue. Alternatively, processing logic may execute some of the process jobs in parallel (e.g., process jobs with the same priority).

Figure 6:
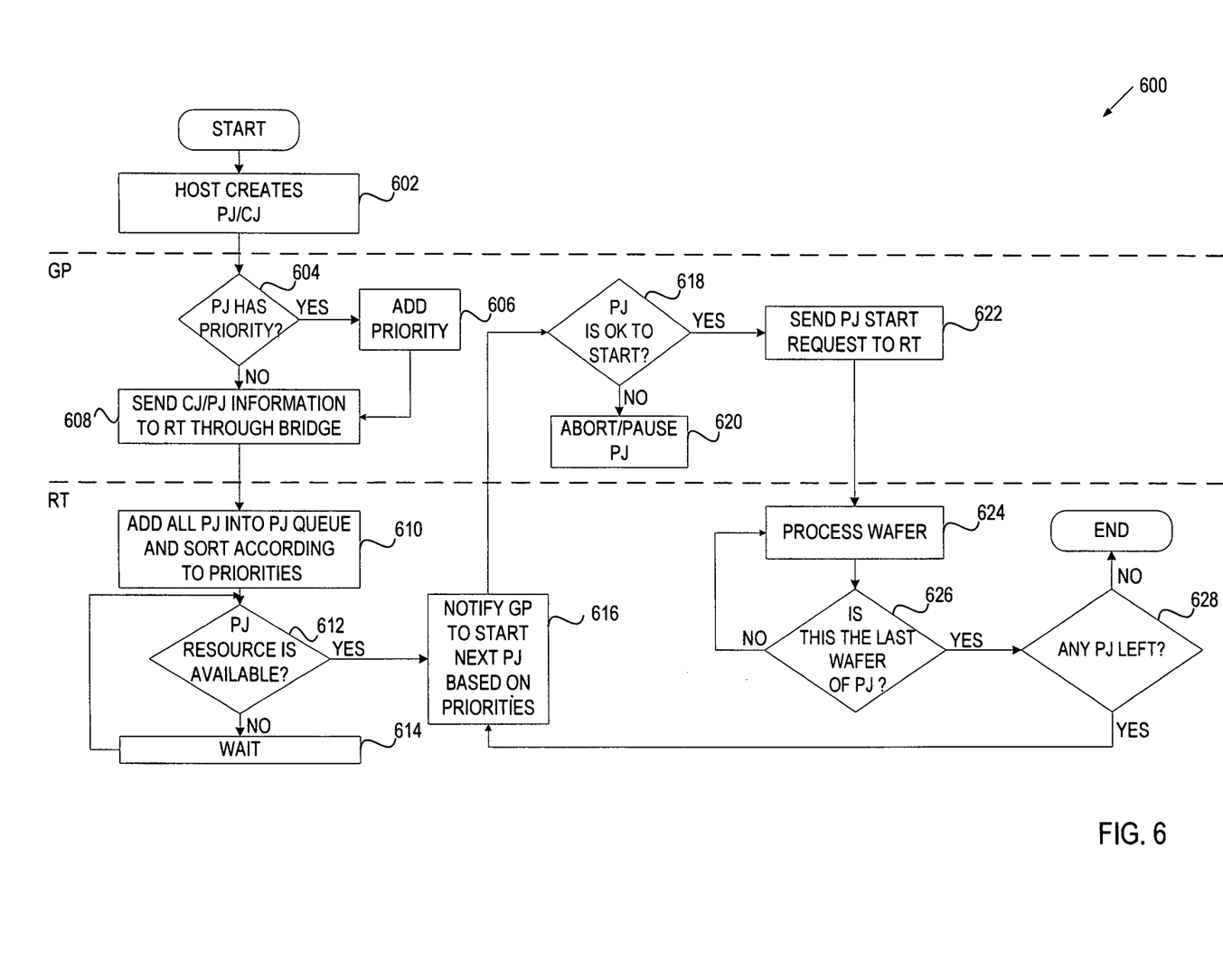
FIG. 6 is a flow diagram of one embodiment of a method for managing process jobs in accordance with SEMI E40.

FIG. 6 is a flow diagram of one embodiment of a method 600 for managing process jobs in accordance with SEMI E30. The method 600 is performed by processing logic that may comprise hardware (circuitry, dedicated logic, etc.), software (such as is run on a general purpose computer system or a dedicated machine), or a combination of both. In one embodiment, method 600 is performed by system 100 of FIG. 1.

In FIG. 6, PJ and CJ stand for process job and control job, respectively. GP stands for a system adopting a GEM Process, and RT stands for a real-time system. Referring to FIG. 6, method 600 begins with the host subsystem creating process jobs and control jobs (e.g., based on user input) (block 602). The system user or process supervisor may also assign a priority to some or all of the process jobs. The host subsystem sends the created process jobs and control jobs to the front-end system.

At block 604, the GP subsystem checks each process job to see if it has an assigned priority. If not, method 600 proceeds to block 608. Otherwise, if a process job has an assigned priority, the GP subsystem adds the priority to the job information (block 606), and then proceeds to block 608. At block 608, the GP subsystem sends the job information (CJ/PJ information) to the RT subsystem.

At block 610, the RT subsystem adds all process jobs received from the GP subsystem to the queue and sorts the process jobs according to the priorities. At block 612, the RT subsystem checks if a processing resource is available for a process job waiting at the top of the queue. Processing resource may include one or more fabrication tools, robots, chambers, substrates, etc. If not, the RT subsystem waits until the processing resource becomes available (block 614). At block 616, the RT subsystem notifies the GP subsystem that the execution of the next process job can begin (block 616).

At block 618, the GP subsystem determines whether the process job can be started. This determination can be made based on whether the process job is in a valid state and the system is in an auto running mode. If this determination is negative, the GP subsystem sends out a command to abort or pause the process job (block 620). Alternatively, the GP subsystem sends a confirmation to start the process job to the RT subsystem (block 622).

Upon receiving the confirmation from the GP subsystem, the RT subsystem processes wafers in accordance with the confirmed process job (block 624). If the current wafer is not the last one for the current process job (block 626), method 600 returns to block 624. Otherwise, the RT subsystem checks to see if there are any process jobs left (block 628). If so, method 600 returns to block 616. If not, method 600 ends.

Accordingly, the order in which process jobs should be executed is modifiable in real time based on priorities, and thus, a new urgent process job can be executed ahead of other normal process jobs. In addition, the process job execution order is determined by the RT subsystem based on information provided by the GP subsystem, making parallel processing capabilities of fabrication tools to be fully utilized.

Some embodiments of a mechanism enabling interactions between the GP subsystem and the RT subsystem will now be discussed in more details. In particular, when a control job transitions to an execution phase, the GP subsystem sends a command (referred to as JOB_DEF command) to the RT subsystem (e.g., at block 608). This command includes the ID of the control job and the description of the associated process jobs, such process jobs IDs, the number of wafers to be processed by each process job, and the priority of the process job. The RT subsystem processes the information provided in the JOB_DEF command and creates a set of queues to arrange process jobs in a desired order. The real-time subsystem generates a "lot processing ready" event with the desired process job identifier (PJID) to the GP subsystem when the real-time subsystem wants to start pulling substrates for a new process job. The real-time subsystem may also generate a "lot processing ready" event to resume a process job which is aborted or stopped.

Figure 7:
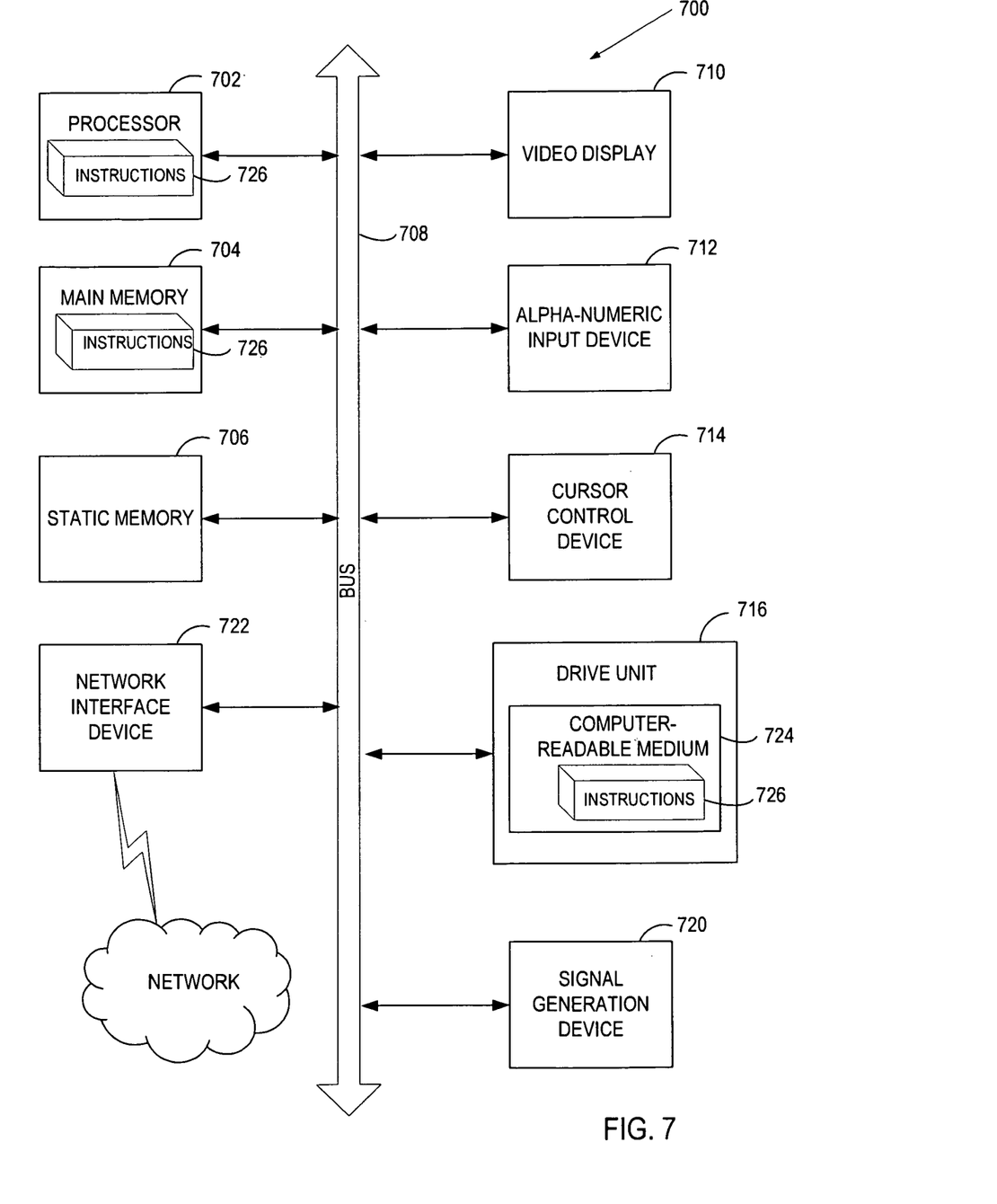
FIG. 7 is a block diagram of an exemplary computer system that may perform one or more of the operations described herein.

FIG. 7 illustrates a diagrammatic representation of a machine (e.g., a computer) in the exemplary form of a computer system 700 within which a set of instructions, for causing the machine to perform any algorithms or methodology discussed herein, may be executed. In alternative embodiments, the machine may be connected (e.g., networked) to other machines in a LAN, a WAN, an intranet, an extranet, the Internet, or a wireless network. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any other machines capable of executing a set of instructions (sequential or combinational or otherwise) that specify actions to be taken by that machine. Executing the set of instructions are performed sequentially or by multitasking or by threading. Further, while only a single machine is illustrated, the term "machine" shall also be taken to include any collection of machines that individually or jointly execute a set (or multiple sets) of instructions to perform any algorithms or methodology discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), a data storage device 708, and a drive unit 716, which communicate with each other via a bus 722.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 1002 is configured to execute the instructions 726 for performing the operations discussed herein.

The computer system 700 may further include a network interface device 730 to communicate via a network 740. The computer system 700 also may include a video display unit 710 (e.g., a cathode ray tube (CRT) or a liquid crystal display (LCD) or plasma display panel (PDP) or thin-film transistor displays (TFT), or organic light-emitting diode (OLED), or nanocrystal displays, etc.), an alphanumeric input device 712 (e.g., a keyboard) and a cursor control device 714 (e.g., a mouse). The alphanumeric input device 712 and/or the cursor control device 714 may be implemented as a touch screen on the display unit 710.

The data storage device 708 may include a machine-accessible storage medium 724 on which is stored one or more sets of instructions (e.g., software 728) embodying any one or more of the methodologies or functions described herein. The software 728 may also reside, completely or at least partially, within the main memory 704 and/or within the processor 702. In other words, during execution thereof by the computer system 700, the main memory 704 and the processor 702 also constitute machine-accessible storage media. The software 728 may further be transmitted or received over a network 740 via the network interface device 730. The drive unit 716 may also include a computer-readable medium 718 storing one or more sets of instructions 726.

While the machine-accessible storage medium 724 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine (e.g., a computer) and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method for managing process jobs in semiconductor fabrication, the method comprising:
    receiving a plurality of process jobs associated with one or more priorities of fabrication processing;
    ordering with a queue the plurality of process jobs in an order reflecting the one or more priorities of fabrication processing associated with the plurality of process jobs;
    executing a current process job selected from the plurality of process jobs in the queue based on the order reflecting the one or more priorities of fabrication processing;
    upon receiving, in real time, a new process job with a priority of fabrication processing higher than the one or more priorities of fabrication processing associated with the plurality of process jobs, modifying, in real time, the order reflecting the priorities of fabrication processing to place the new process job ahead of the plurality of process jobs in the queue; and
    executing the new process job upon completion of execution of the current process job based on the modified order.

2. The method of claim 1, wherein each process job is associated with a recipe for processing a substrate of a processing lot.

3. The method of claim 1, wherein the priorities are assigned by a user through a host system.

4. The method of claim 1, further comprising:
    receiving the new process job with a higher priority; and
    placing the new process job in the queue ahead of process jobs with lower priorities or no priority and behind process jobs with higher priorities.

5. The method of claim 1, wherein each process job is associated with a control job, and the new process job is executed after an execution of a current control job is completed, wherein the control job includes a plurality of process jobs and only the process jobs with a higher priority are placed ahead of existing process jobs in the queue.

6. The method of claim 1, wherein executing a current process job selected from the plurality of process jobs comprises:
    selecting the current process job from the queue sorted according to the one or more priorities;
    checking if a processing resource is available for the current process job in the queue;
    sending out a notice that the current process job is to be performed when the processing resource is available;
    receiving a confirmation in response to the notice; and
    starting to perform the current process job.

7. A computer-implemented method for managing process jobs in semiconductor fabrication, the method comprising:
    checking a plurality of process jobs to determine whether one or more priorities of fabrication processing are associated with the plurality of process jobs;
    preparing job information including the priorities of fabrication processing; and
    sending out the job information for the plurality of process jobs to be executed in an order reflecting the priorities of fabrication processing, wherein the order is modified in real time when a new process job with a priority higher than the priorities of the plurality of process jobs is added to be executed to place the new process job ahead of the plurality of process jobs in a queue such that the new process job is executed upon completion of a currently executing process based on the modified order.

8. The method of claim 7, wherein each process job is associated with a recipe for processing a substrate.

9. The method of claim 7, wherein the priorities are assigned by a user through a host computer.

10. The method of claim 7, further comprising:
receiving a request for a confirmation to execute a next process job; and
sending out the confirmation for an execution of the next process job.

11. A system for managing process jobs in semiconductor fabrication, the system comprising:
a queue to queue process jobs; and
a real-time sequencer, coupled to the queue, to receive a plurality of process jobs associated with one or more priorities of fabrication processing, to order with the queue the plurality of process jobs in an order reflecting the one or more priorities of fabrication processing associated with the plurality of process jobs, to execute a current process job selected from the plurality of process jobs in the queue based on the order reflecting the one or more priorities of fabrication processing, to modify, in real time, the order reflecting the priorities of fabrication processing to place the new process job ahead of the plurality of process jobs in the queue upon receiving, in real time, a new process job with a priority higher than the one or more priorities of fabrication processing associated with the plurality of process jobs, and to execute the new process job upon completion of execution of the current process job based on the modified order.

12. The system of claim 11, wherein the real-time sequencer is to receive the new process job with a higher priority, and to place the new process job in the queue ahead of process jobs with lower priorities or no priority and behind process jobs with higher priorities.

13. The system of claim 11, wherein each process job is associated with a control job, and the real-time sequencer is to execute the new process job after an execution of a current control job is completed, wherein the control job includes a plurality of process jobs and only the process jobs with a higher priority are placed ahead of existing process jobs in a queue.

14. The system of claim 11, wherein the real-time sequencer is to check if processing resource is available for a next process job in the queue, to send out a notice that the next process job is to be executed when the processing resource is available, to receive a confirmation in response to the notice, and to execute the next process job.

15. The system of claim 11 further comprising:
a front-end subsystem, coupled to the real-time sequencer, to check the plurality of process jobs, to determine whether one or more priorities are associated with the plurality of process jobs, to prepare job information regarding the plurality of process jobs and the priorities, and to send out the job information to the real-time sequencer.

16. The system of claim 14, wherein the front-end subsystem is further to receive the notice, to determine whether the next process job is to be executed, and to send out the confirmation upon determining that the next process job is to be executed.

17. A non-transitory computer-readable storage medium storing instructions that when executed by a computer, cause the computer to perform a method for managing process jobs in semiconductor fabrication, the method comprising:
receiving a plurality of process jobs associated with one or more priorities of fabrication processing; and
ordering with a queue the plurality of process jobs in an order reflecting the one or more priorities of fabrication processing associated with the plurality of process jobs;
executing a current process job selected from the plurality of process jobs in the queue based on the order reflecting the one or more priorities of fabrication processing;
upon receiving, in real time, a new process job with a priority higher than the one or more priorities of fabrication processing associated with the plurality of process jobs, modifying, in real time, the order reflecting the priorities of fabrication processing to place the new process job ahead of the plurality of process jobs in the queue; and
executing the new process job upon completion of execution of the current process job based on the modified order.

18. The non-transitory computer-readable storage medium of claim 17, wherein the method further comprises:
receiving the new process job with a higher priority; and
placing the new process job in the queue ahead of process jobs with lower priorities or no priority and behind process jobs with higher priorities.

19. The non-transitory computer-readable storage medium of claim 17, wherein each process job is associated with a control job, and the new process job is executed after an execution of a current control job is completed, wherein the control job includes a plurality of process jobs including a process job with a higher priority, wherein all of the process jobs associated with the control job are placed ahead of existing process jobs in the queue.

20. The non-transitory computer-readable storage medium of claim 17, wherein executing a current process job selected from the plurality of process jobs comprises:
selecting the current process job from the queue sorted according to the one or more priorities;
checking if a processing resource is available for the current process job in the queue;
sending out a notice that the current process job is to be performed when the processing resource is available;
receiving a confirmation in response to the notice; and
starting to perform the current process job.

* * * * *